United States Patent [19]

Prinsloo et al.

[11] Patent Number: 4,971,603

[45] Date of Patent: Nov. 20, 1990

[54] VORTEX TUBE SEPARATING DEVICE

[75] Inventors: Willem J. C. Prinsloo, Sinoville; Pierre de Villiers, Schoemansville; Marten C. van Dijken, Magalieskruin, all of South Africa

[73] Assignee: Cyclofil (Proprietary) Limited, Pretoria, South Africa

[21] Appl. No.: 360,070

[22] Filed: Jun. 1, 1989

[30] Foreign Application Priority Data

Jun. 2, 1988 [ZA] South Africa ........................ 88/3923

[51] Int. Cl.[5] ................................................ B01D 19/00

[52] U.S. Cl. ................................................ 55/1; 55/52; 55/337; 55/399; 55/345; 55/457

[58] Field of Search ........................ 55/1, 52, 319, 337, 55/396, 399, 448, 451, 456, 457, 345–348

[56] References Cited

U.S. PATENT DOCUMENTS

| | | | |
|---|---|---|---|
| 3,590,560 | 7/1971 | Pall | 55/457 |
| 3,713,280 | 1/1973 | Keller et al. | 55/457 X |
| 4,008,059 | 2/1977 | Monson et al. | 55/396 |
| 4,162,906 | 7/1979 | Sullivan et al. | 55/457 X |
| 4,289,611 | 9/1981 | Brockmann | 55/345 X |
| 4,746,340 | 5/1988 | Durre et al. | 55/396 X |

FOREIGN PATENT DOCUMENTS

| | | |
|---|---|---|
| 0019057 | 3/1980 | European Pat. Off. . |
| 1207028 | 9/1970 | United Kingdom . |
| 1236941 | 6/1971 | United Kingdom . |
| 1420807 | 1/1976 | United Kingdom . |
| 1465833 | 3/1977 | United Kingdom . |
| 1465915 | 3/1977 | United Kingdom . |
| 1473099 | 5/1977 | United Kingdom . |
| 2064359 | 6/1981 | United Kingdom . |

*Primary Examiner*—Charles Hart

[57] ABSTRACT

A vortex tube gas cleaning device 110 is used to clean a particle containing gas flow stream of particles. The device 110 has an outer tube 112 having an inlet 114 at an upstream end, and, in series downstream of the inlet 114 a vortex generator 116 in a vortex region 118, and a separation region 119. An inner extraction tube 140 is located at the downstream end of the tube 112 and extends concentrically within the outer tube 112, upstream, canti-lever fashion. A peripheral outlet region 122 is defined annularly around the inner tube 140 downstream of the separation region 119 and leads to an outlet port 136. A central outlet region 124 is defined within the inner tube 140 downstream of the separation region 119 and leads to an outlet 148. The periphery 130 of the outer tube 112 diverges at an angle 132 through the vortex generating region 118 and the separation region 119. The periphery of the vortex generator 116 diverges correspondingly.

12 Claims, 2 Drawing Sheets

VORTEX TUBE SEPARATING DEVICE

BACKGROUND OF THE INVENTION

1. Field of the Invention

This invention relates to a separating device suitable for use in treating a particle containing gas flow stream to separate particles from the gas or to clean the gas of particles.

2. Description of Background Art

The kind of separating device to which the invention relates, can more precisely be described as a vortex tube particle recovery device or as a vortex tube gas cleaning device, depending on which aspect of its operation emphasis is placed. This invention more particularly has in mind the cleaning of gas, especially the cleaning of air. Thus, generally, the term vortex tube gas cleaning device will be used in the specification.

For convenience, to denote direction, the terms "upstream" and "downstream" will be used in this specification. These terms should be interpreted in relation to the normal direction of flow through the device in use.

SUMMARY AND OBJECTIONS OF THE INVENTION

More specifically, the invention relates to a vortex tube gas cleaning device or particle recovering device suitable for use in treating a particle containing gas flow stream to clean the gas of particles or to recover particles from the gas, the device comprising an outer round tube having an inlet at one end which will be an upstream end in use and an opposed end which will be a downstream end in use, the outer round tube having a continuously divergent portion extending from the inlet downstream through a predetermined axial distance;

an axially arranged vortex of rotating flow generator in a vortex generating region in the tube downstream of the inlet;

a separation region downstream of the vortex generating region, said predetermined axial distance being at least equal to the cumulative length of the vortex generating region and the separation region;

a peripheral outlet region toward the periphery of the tube downstream of the separation region;

a central outlet region toward the center of the tube downstream of the separation region;

an inner round extraction tube, arranged concentrically within the outer round tube to separate the peripheral and central outlet regions, having an inlet at an upstream end thereof which is at a predetermined axial position corresponding to the end of the separation region, and an outlet means for the central outlet region at a downstream end thereof, said upstream end of the inner round extraction tube cooperating with the outer round tube to define an annular inlet of the peripheral outlet region;

locating means locating the inner round extraction tube toward the downstream end thereof to the outer round tube such that the inner round extraction tube extends cantilever fashion in an upstream direction from the locating means and such that the inlet of the peripheral outlet region is circumferentially continuous and without circumferentially interupted structure; and outlet means for the peripheral outlet region toward a downstream end thereof.

In accordance with the invention, in cleaning a particle containing gas flow stream from particles in a gas cleaning device, or recovering particles from a particle containing gas flow stream in a particle recovering device, of the kind described, by introducing the particle containing gas flow stream axially into the outer round tube via its inlet;

inducing rotating flow in said particle containing gas flow stream by guiding it through the vortex generator;

allowing the particles to concentrate toward the outer periphery of the flow stream on account of the rotating flow;

guiding a particle enriched portion of the flow stream, toward the outer periphery of the tube, into the peripheral outlet region; and guiding a particle depleted portion of the flow stream, toward the center of the tube, into the central outlet region, there is provided the step of allowing the flow, upstream of the peripheral outlet region and the central outlet region, to diverge by providing a divergent portion in the periphery of the outer tube.

Said divergence may be allowed to take place in the separation region.

Said divergence may take place over an axial length of the same order of magnitude as the nominal diameter of the tube at the inlet. Thus, it may take place over an axial length between about 0.5 times and about 2 times, preferably between about 0.7 times and 1.5 times, the nominal diameter of the tube.

The degree of divergence may be such that it increases the flow area by an amount of between about 5% and about 200%, preferably between about 15% and about 60%.

The included angle of divergence may be between about 2.5° and about 20°, preferably about 5° to 10°. Thus, the inner periphery may form an angle of about 2.5° to 5° with the axis of the tube.

Instead, in a preferred method, such divergence may be allowed to take place in substantially the whole of the region of the vortex generator as well as in the separating region. Then, divergence may take place over an axial length between about 1 time and about 3 times the nominal diameter of the outer tube at its inlet. Correspondingly, the increase in flow area may be between about 30% and about 800%, preferably between about 500% and and about 600%. Correspondingly, the included angle of divergence may be between about 7° and about 120°, preferably between about 15° and about 60°, most preferably about 30°.

Accordingly, the invention extends to a vortex tube gas cleaning device or vortex tube particle recovery device of the kind described and suitable for use in carrying out the method of the invention, in which at least a portion of the periphery of the outer tube upstream of the peripheral outlet region and central outlet region is divergent.

The divergent portion may be in the separation region.

Instead, in a preferred embodiment, the periphery of the outer tube in the region of the vortex generator and the separation region may be divergent. The periphery of the vortex generator is preferably correspondingly divergent. Then, preferably, a central chine of the vortex generator may be divergent, which divergence may be of the same order as the divergence of the vortex generator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
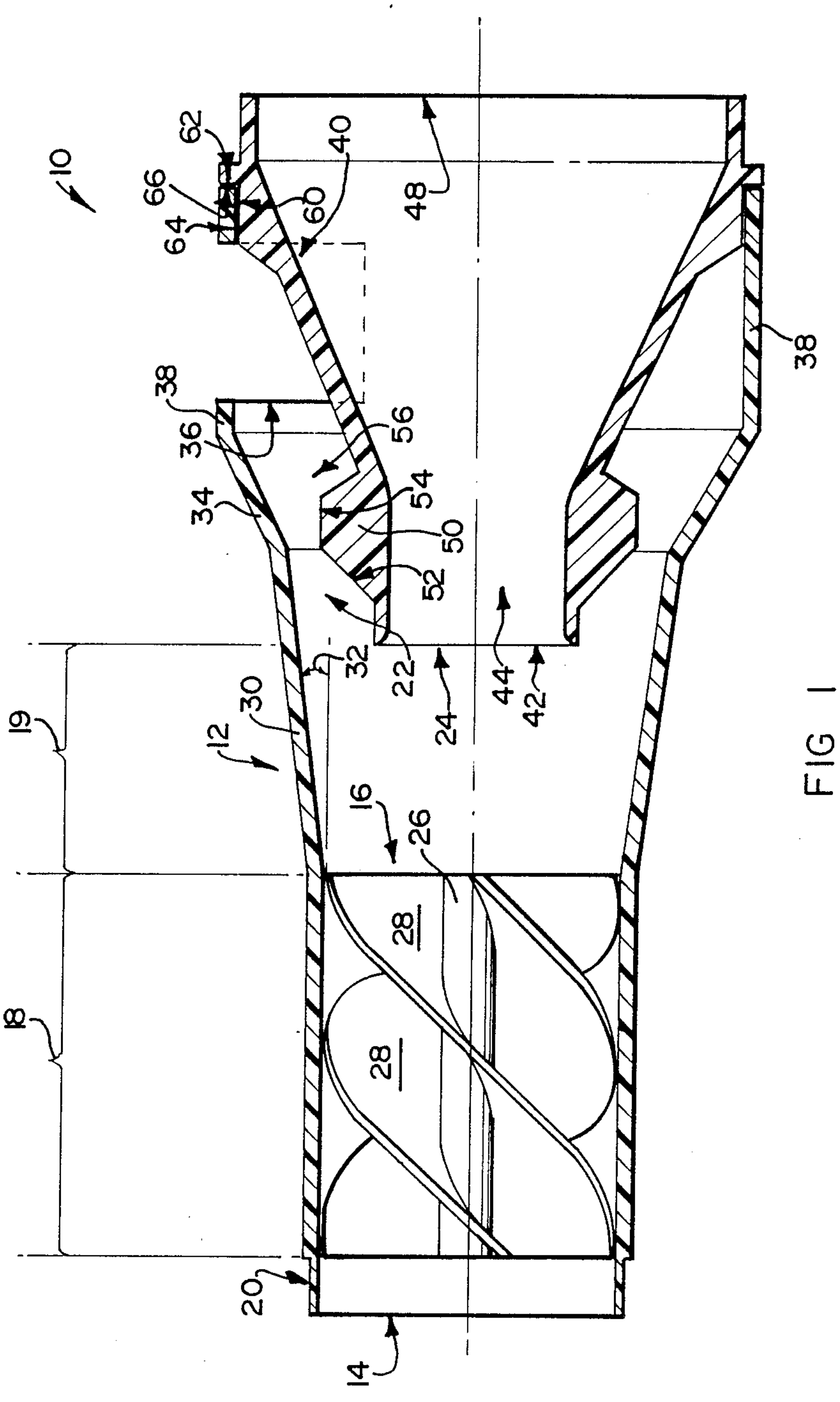
FIG. 1 is an axial sectional view illustrating a first embodiment of the present invention.

With reference to FIG. 1 of the drawings, a first embodiment of a vortex tube gas cleaning device is generally indicated by reference numeral 10. The device 10 is generally of symmetrical round shape and is assembled of different components of moulded synthetic plastics material. In other embodiments, the devices may be of other materials, such as of abrasion-resistant metal, e.g. steel; corrosion-resistent or non-corrosive metal, e.g. steel; or the like.

The device 10 comprises an outer round tube generally indicated at 12, a vortex generator 16 fitting snugly within the tube 12 toward end and inner extraction tube 40 in the form of an inner round tube fitted co-axially within the outer tube 12 toward the opposed end thereof. The end having the vortex generator will in use be the upstream end, and the opposed end will be the downstream end.

At said upstream end, the tube 12 has an inlet 14. From the inlet 14, the tube 12 extends parallel for a portion of its length to define a vortex generating region 18 within which the vortex generator 16 is located. At its upstream end, the tube 12 has a mounting formation in the form of a recess 20.

The vortex generator 16 has a central core or chine 26 and a pair of helical blades 28 arranged around the core 26, auger fashion. Each blade curves through an angle of 180°. At their peripheries, each blade is at an angle of 57° with the axis.

Downstream of the vortex generating region 18, the wall of the tube 12 diverges as indicated at 30 for a predetermined distance. The included angle of divergence is equal to twice the angle 32 between the diverging wall and the axis of the device 10. The angle 32 is 5° and the included angle is thus 10°.

Downstream of the divergent portion 30, the tube diverges more sharply to form a diffuser wall, which will be described in more detail hereinafter, generally indicated by reference numeral 34.

Downstream of the diffuser wall 34, the tube 12 is parallel as indicated at 38. A single outlet port 36 which extends around a portion of the circumference through an angle of about 120°, is provided in the tube 12 in the parallel portion 38.

The extraction tube 40 has at an upstream end an inlet identified by its leading edge 42 and which leads into a central passage 44 which blends into a diffuser and extends to an outlet 48 of the extraction tube 40.

The leading edge 42 is at a predetermined axial position of the device 10. A separation region 19 is formed between the downstream end of the vortex generator and the leading edge 42. It is to be appreciated that the separation region 19 is divergent as described above.

Downstream of the separation region 19, an outer peripheral or scavenge region 22 is formed annularly between the inner extraction tube 40 and the outer tube 12; and a central or main outlet region 24 is formed bounded by the inner extraction tube 40. Both the scavenge region 22 and the main outlet region 24 are downstream of the separation region 19.

An annular inlet to the scavenge region 22 is formed around the leading edge 42. Closely spaced downstream of said inlet, a ring 50 which is integral with the inner extraction tube 40 projects into the scavenge region 22. The ring 50 forms an oblique leading wall 52 which, in use, contracts the flow in the scavenge region toward an annular orifice 54 defined annularly outside the crown of the ring 50.

The diverging wall portion 34 acts like a diffuser in respect of flow downstream of the annular orifice 54.

Toward its downstream end, the inner extraction tube 40 forms a spigot portion 60, which may be slightly taper if desired. The spigot 60 terminates in an outwardly extending flange having a shoulder 62. The spigot 60 fits snugly within the end portion 64 of the tube 12 and the end 66 of the tube 12 checks the shoulder 62. Thus, the inner extraction tube 40 is concentrically and axially located relative to the outer tube 12. The inner extraction tube 40 extends cantilever fashion in an upstream direction to render the scavenge region 22 unrestricted. Thus the flow passage through the scavenge region 22 including the annular orifice 54 is continuous.

In use, a particle containing gas flow stream is introduced into the tube 12 via the inlet 14. Rotating flow is induced in the flow stream by the vortex generator 16 while the flow stream moves through the vortex generating region 18. When the rotating flow stream enters the separation region 19, it diffuses outwardly as allowed by the divergence 32.

The rotating nature of the flow stream causes centrifugal forces to act on the particles, which are heavier than the gas in the flow stream, and to induce the particles to migrate outwardly and concentrate toward the outer periphery of the flow stream. The divergence 32 allows the particles to move radially further outwardly than what would have been possible in a parallel separation region. The divergence 32 has a secondary, diffuser effect of decelerating the flow thus gaining static pressure in the flow stream at the expense of kinetic or dynamic pressure. The decelerated flow also ameliorates wear on the tube 12 which is of importance especially in the case of abrasive particles.

Generally, the particles are concentrated or enriched in the peripheral portion of the flow stream and the central portion of the flow stream is depleted of particles.

As the particle enriched peripheral portion of the flow stream flows into the scavenge region 22, it is first accelerated as it is contracted along the oblique wall 52 into the orifice 54, and is thereafter decelerated along the diffuser wall 34. The particle enriched portion of the flow stream moves into a plenum 56 from where it exits ia the outlet port 36.

The particle depleted portion of the flow stream enters the central or main outlet region via the leading edge 42, is diffused in the diffuser and exits via the outlet 48.

It is to be appreciated that the mass or volume flow ratio of the particle depleted flow stream to the particle enriched flow stream, which is referred to as the "cut" is controlled by controlling the pressure ratios between the inlet pressure at the inlet 14 and the pressure downstream of the outlet port 36 on the one hand, and between the inlet 14 and downstream of the outlet 48 on the other hand.

It is to be appreciated that the effect of the divergence 32 in the separation region 19 described above enhances concentration of the particles in the scavenge region 22.

In the diffuser region 34, static pressure is gained at the expense of dynamic or kinetic pressure, similarly to the secondary effect in the separation region 19. Such gaining of static pressure at the expense of kinetic or dynamic pressure reduces the pressure drop between the inlet 14 and the plenum 56 and thus increases the efficiency of the device 10 from an energy consumption point of view.

Similarly, the diffuser in the central passage 44 gains static pressure at the expense of kinetic or dynamic pressure which reduces the pressure drop between the inlet 14 and the exit 48 and increases the efficiency of the device 10 from an energy consumption point of view.

In a test sample of the general configuration of FIG. 1, having an included angle of divergence of 9°, an outer tube inner diameter of 18 mm, a total length of 60 mm, a vortex generating region length of 20 mm, a vortex angle of 180° and a central orifice inner diameter of 10 mm, and operating at a total pressure drop of 4 inch standard water gauge (about 1 kPa) and an air mass flow of 4.6 gram per second, a total mass efficiency of dust removal of about 97% was obtained for AC coarse dust and operating at a 100% cut, i.e. no scavenge flow.

For the same sample, and operating at 90% cut, the total pressure drop was 4 inch standard water gauge (about 1 kPa), the air mass flow was 46 gram per second in the main flow stream, and the separation efficiency was more than 98%.

Both tests were done with AC coarse dust.

Figure 2:
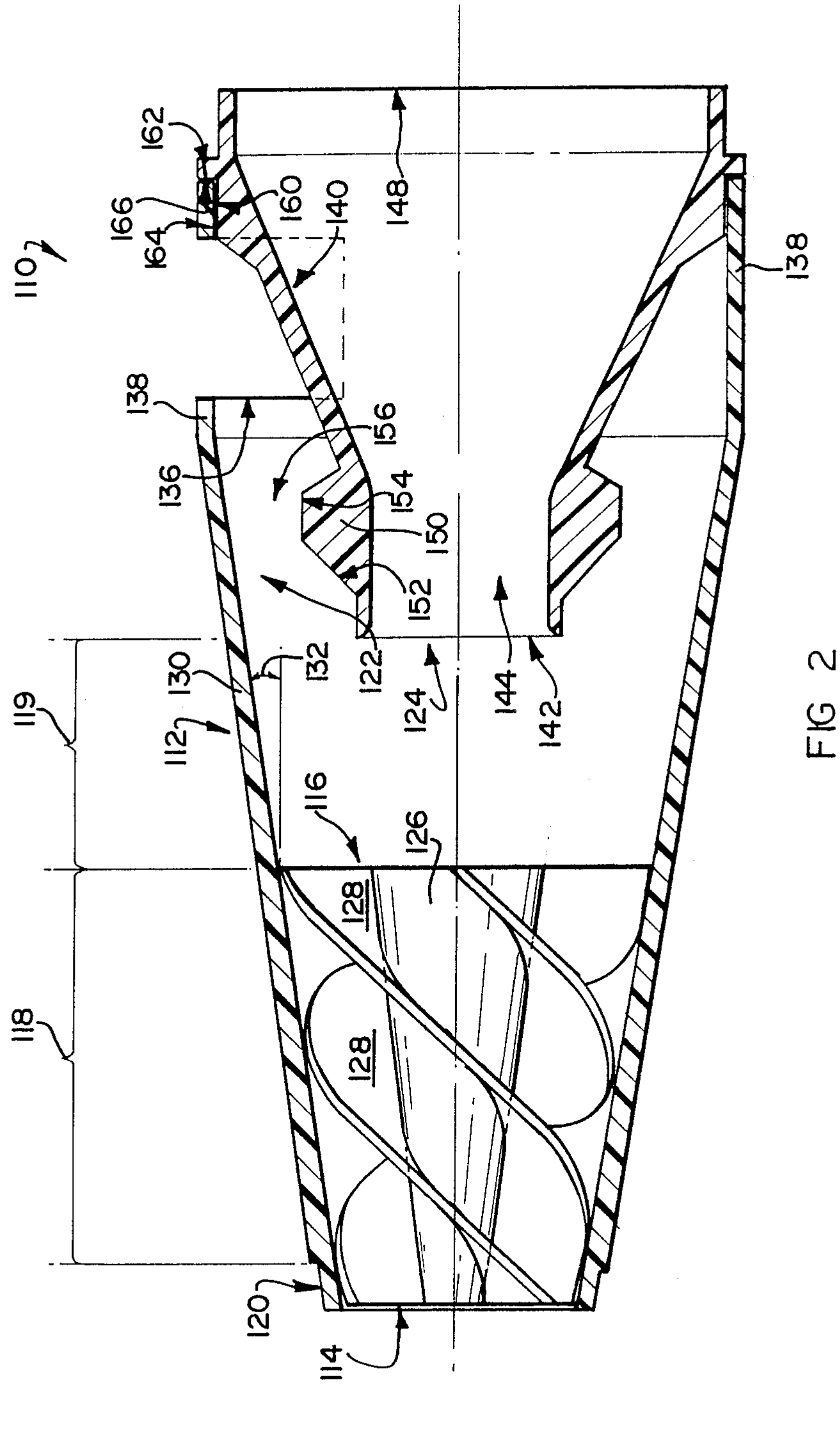
FIG. 2 is an axial sectional view illustrating a second embodiment of the present invention.

With reference to FIG. 2, another embodiment of a vortex tube gas cleaning device in accordance with the invention is generally indicated by reference numeral 110. It is generally similar to the device 10 of FIG. 1 and is not again described. Like reference numerals refer to like parts.

The device 110 differs from the device 10 in one important respect. The outer round tube 112 diverges from its inlet 114 to a position intermediate the annular orifice 154 and the outlet port 136. The included angle of divergence, in this embodiment, is constant and is about 30°. The outer periphery of the vortex generator 116 diverges correspondingly.

The core or chine 126 of the vortex generator 116 also diverges, generally at about the same angle as that of the outer tube 112.

In a test sample of the general configuration of FIG. 2, having an included angle of divergence of 14°, an outer tube inner diameter of 18 mm, a total length of 60 mm, a vortex generating region length of 20 mm, a vortex angle of 180°, a total length of divergence of 40 mm, and a central orifice inner diameter of 12.5 mm i.e. 56% larger flow area than 10 mm diameter, and operating at a total pressure drop of 3.4 inch standard water gauge (about 0.85 kPa) and an air mass flow of 5 gram per second, a total mass efficiency of dust removal of about 97% was obtained for AC coarse dust and operating at a 100% cut, i.e. no scavenge flow.

For the same sample, and operating at 90% cut, the total pressure drop was 3.4 inch standard water gauge (about 0.85 kPa), the air mass flow was 4.7 gram per second in the main flow stream, and the separation efficiency was more than 98%.

Both tests were done with AC coarse dust.

In another test sample of the general configuration of FIG. 2, having an inlet diameter of 50 mm, an included angle of divergence of 30°, a total length of 160 mm, and a central orifice inner diameter of 40 mm, and operating at a total pressure drop of 2.8 inch standard water gauge (about 0.7 kPa) and an air mass flow of 30 gram per second, a total mass efficiency of dust removal of about 91% was obtained for AC coarse dust and operating at a 100% cut, i.e. no scavenge flow.

For the same sample, and operating at 100% cut, and with Alumina of median particle size of 86 micro meter, the total pressure drop was 2.8 inch standard water gauge (about 0.7 kPa), the air mass flow was 30 gram per second in the main flow stream, and the separation efficiency was 99.7%.

The Inventors have made inventive contributions to a number of aspects of separating devices of the kind to which this invention relates. The instant invention emphasises one such aspect namely divergent flow. It is to be appreciated that the feature of the current invention, together with features emphasized in co-pending applications by the same inventors, give rise to a number of advantages. Herebelow, those advantages to which the current invention contribute substantially, are highlighted. It is to be appreciated that the feature of the current invention in isolation, is not necessarily the sole factor in the advantages mentioned.

The advantages of the embodiment of FIG. 2 are generally similar to those of the embodiment of FIG. 1, but to a larger degree, because of amplified divergence on account of a generally longer divergence and a generally larger angle of divergence.

The Inventors have found that, by commencing divergence in (at commencement of) the vortex generating region, a larger angle of divergence can be tolerated than in the FIG. 1 embodiment.

The Inventors have found that the ratio of the swirl or rotating component of velocity to the axial component of velocity (also called the "Swirl Number") is directly proportional to the radius of the divergent portion. Thus, although the absolute values of both components of flow velocity decrease due to the divergence the Swirl Number increases.

When a diverging type of gas cleaning device is compared to a parallel type device of diameter equal to the larger diameter of the diverging device, it is of significance that the swirl (in the diverging device) is initially much more intense resulting in a faster concentration of particles toward the outer periphery, and thus enhances separation. The enhanced concentration toward the outer periphery allows one the option of using an inlet of larger diameter, without sacrificing separation efficiency. The larger diameter inlet has a significant beneficial affect on the pressure drop and thus the energy consumption.

The Inventors have thus found that, under circumstances requiring a high separation efficiency at a low pressure drop, a divergent type of separating device yields a more advantageous design than a parallel type of device.

When a divergent device is compared to a parallel device of the smaller diameter, separation efficiency remains good in spite of lower absolute swirl component of velocity because of the longer resident time on account of the lower axial velocity component.

An advantage of the divergent device is that it has a significant benefit in respect of erosion or abrasion. It has been found that erosion is exponentially proportional to the speed, the exponent being higher than 3.

The Inventors are of opinion that a divergent separation device, especially of the FIG. 2 type, can advantageously be used as a primary separator, or as a first stage of a series separator. They have found that a divergent separating device is less prone to blockage than parallel devices of comparable performance—simply stated, if an object with potential for blocking such as a piece of cloth or paper, is present in the flow stream, and can enter the inlet, it can generally pass through the device, more specifically through the peripheral outlet region.

The Inventors have found that a separating device in accordance with the invention, can generally operate satisfactorily at a 100% cut, i.e. with substantially no gas flow in the peripheral outlet region. A 100% cut is in practice achieved by communicating the outlet means for the peripheral outlet region with a closed chamber The chamber will have means to allow emptying thereof from time to time to remove particles. Although this will normally marginally reduce the separation efficiency, it has large advantages in that treatment of the scavenge flow is greatly simplified. Merely the scavenged particles need be processed—there is no scavenge gas flow to process such as by filtration. This has beneficial cost implications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of cleaning a particle containing gas flow stream from particles in a gas cleaning device, or recovering particles from a particle containing gas flow stream in a particle recovering device, of the kind comprising:

an outer round tube having an inlet at one end which will be an upstream end in use, and an opposed end which will be a downstream end in use, the outer round tube having a continuously divergent portion extending from the inlet downstream through a predetermined axial distance;

an axially arranged vortex or rotating flow generator in a vortex generating region in the tube downstream of the inlet;

a separate region downstream of the vortex generating region, said predetermined axial distance being at least equal to the cumulative length of the vortex generating region and the separation region;

a peripheral outlet region toward the periphery of the tube downstream of the separation region;

a peripheral outlet region toward the periphery of the tube downstream of the separation region;

a central outlet region toward the center of the tube downstream of the separation region;

an inner round extraction tube, arranged concentrically within the outer round tube to separate the peripheral and central outlet regions, having an inlet at an upstream end thereof which is at a predetermined axial position corresponding to the end of the separation region, and an outlet means for the central outlet region at a downstream end thereof, said upstream end of the inner round extraction tube cooperating with the outer round tube to define an annular inlet of the peripheral outlet region;

locating means locating the inner round extraction tube toward the downstream end thereof to the outer round tube such that the inner round extraction tube extends cantilever fashion in an upstream direction from the locating means and such that the inlet of the peripheral outlet region is circumferentially continuous and without circumferentially interrupted structure; and outlet means for the peripheral outlet region toward a downstream end thereof, the method including introducing the particle containing gas flow stream axially into the outer round tube via its inlet;

inducing rotating flow in said particle containing gas flow stream by guiding it through the vortex generator;

allowing the particles to concentrate toward the outer periphery of the flow stream on account of the rotating flow;

guiding a particle enriched portion of the flow stream, toward the center of the tube, into the central outlet region;

guiding a particle depleted portion of the flow stream, toward the center of the tube, into the central outlet region; and allowing the flow to diverge along said continuously divergent portion of the outer round tube.

2. A method as claimed in claim 1 including allowing said flow to diverge over an axial length between about 1 time and about 3 times the nominal diameter of the outer tube at its inlet.

3. A method as claimed in claim 1, including allowing said flow to diverge to a flow area which is larger than the flow area of the inlet of the outer round tube by between about 30% and about 800%.

4. A method as claimed in claim 1, including allowing said flow to diverge at an included angle of divergence between about 7° and about 120°.

5. A method as claimed in claim 1; including allowing said flow to diverge at an included angle of divergence between about 15° and about 60°.

6. A vortex tube gas cleaning device or vortex tube particle recovery device suitable for use in treating a particle containing gas flow stream to clean the gas of particles or to recover particles from the gas, the device comprising:

an outer round tube having an inlet at one end which will be an upstream end in use, and an opposed end which will be a downstream end in use, the outer round tube having a continuously divergent portion extending from the inlet downstream through a predetermined axial distance;

an axially arranged vortex or rotating flow generator in a vortex generating region in the tube downstream of the inlet;

a separation region downstream of the vortex generating region, said predetermined axial distance being at least equal to the cumulative length of the vortex generating region and the separation region;

a peripheral outlet region toward the periphery of the tube downstream of the separation region;

a central outlet region toward the center of the tube downstream of the separation region;

an inner round extraction tube, arranged concentrically within the outer round tube to separate the peripheral and central outlet regions, having an inlet at an upstream end thereof which is at a predetermined axial position corresponding to the end of the separation region, and an outlet means for the central outlet region at a downstream end thereof, said upstream end of the inner round extraction tube cooperating with the outer round tube to define an annular inlet of the peripheral outlet region; and locating means locating the inner round extraction tube toward the downstream end thereof to the outer round tube such that the inner round extraction tube extends cantilever fashion in an upstream direction from the locating means and such that the inlet of the peripheral outlet region is circumferentially continuous and without circumferentially interupted structure; and outlet means for the peripheral outlet region toward a downstream end thereof.

7. A device as claimed in claim 6 in which the length of the divergent portion is between about 1 time and about 3 times the nominal diameter of the outer tube at its inlet.

8. A device as claimed in claim 6 in which the flow area at the downstream end of the separation region is between about 30% and about 800% larger than at the inlet of the outer tube.

9. A device as claimed in claim 6, in which the included angle of divergence is between about 7° and about 120°.

10. A device as claimed in claim 6 in which the periphery of the vortex generator is correspondingly divergent.

11. A device as claimed in claim 6 in which the included angle of divergence is between the 15° and about 60°.

12. A device as claimed in claim 10 in which a chine of the vortex generator is correspondingly divergent.

* * * * *

UNITED STATES PATENT AND TRADEMARK OFFICE

CERTIFICATE OF CORRECTION

PATENT NO. : 4,971,603

DATED : November 20, 1990

INVENTOR(S) : Willem J. C. Prinsloo, Pierre de Villiers, and Marten C. van Dijken It is certified that error appears in the above-indentified patent and that said Letters Patent is hereby corrected as shown below:

Column 6, line 61, after "inlet" insert -- to the central outlet tube --

Column 7, Claim 1,

Line 15, change "separate" to -- separation --

Lines 21 and 22, delete "a peripheral outlet region toward the periphery of the tube downstream of the separation region;"

Column 8, Claim 1,

Line 55, change "center" to -- periphery --

Line 56, change "central" to -- peripheral --

Signed and Sealed this

Seventeenth Day of January, 1995

Attest:

Bruce Lehman

BRUCE LEHMAN

*Attesting Officer*

*Commissioner of Patents and Trademarks*